July 17, 1951 — P. K. BUYS ET AL — 2,561,049

PROTECTION OF LOW-FREQUENCY AMPLIFIER OR OUTPUT TUBES AGAINST OVERLOAD

Filed July 19, 1947

INVENTORS.
PIETER KLAAS BUYS
JOHANNES MEYER CLUWEN

BY Fred M Vogel

AGENT.

Patented July 17, 1951

2,561,049

UNITED STATES PATENT OFFICE 2,561,049

PROTECTION OF LOW-FREQUENCY AMPLIFIER OR OUTPUT TUBES AGAINST OVERLOAD

Pieter Klaas Buys and Johannes Meyer Cluwen, Eindhoven, Netherlands, assignors to Hartford National Bank and Trust Company, Hartford, Conn., trustee Application July 19, 1947, Serial No. 762,142
In the Netherlands July 27, 1946

9 Claims. (Cl. 179—171)

Figures 1, 2, 3:
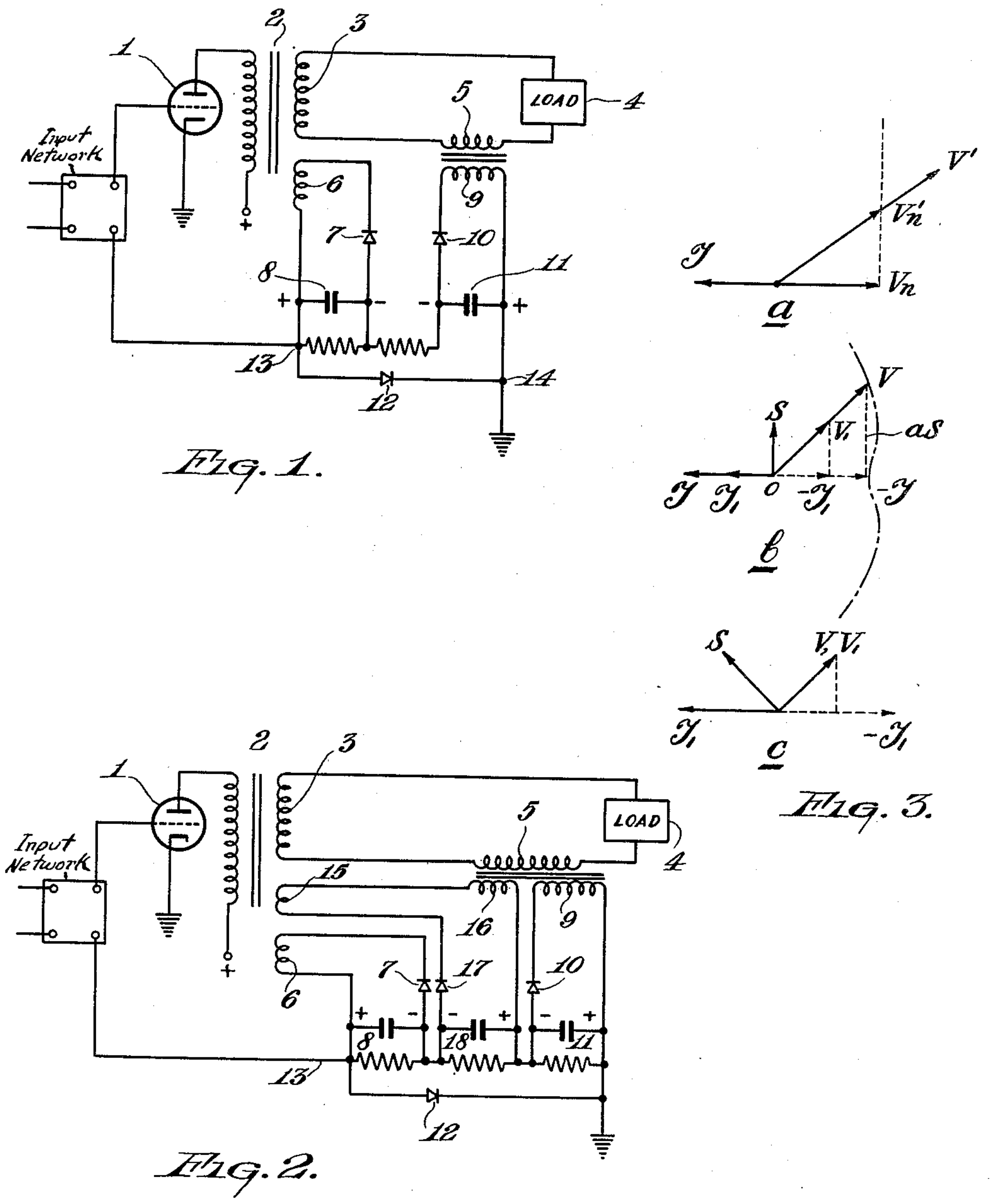

This invention relates to a circuit for protecting against overload amplifying tubes in class AB, B or C, which are loaded by an impedance and more particularly output tubes in class B which are connected in push-pull.

As is well-known, amplifying tubes operated in class B are subject to the danger of being overloaded if the load impedance becomes too small. This may occur, for example, with the output tubes of amplifiers for radio relay-exchanges, where the load on the amplifier varies with the number of listening subscribers or where short-circuit of the load impedance occurs.

According to the invention, in order to avoid this overload, a control voltage is produced which is dependent on the value of the load impedance and which reduces the amplitude of the anode current of the tube which is to be protected. This control voltage is equal to $|I|-|V|+|S|-C$. This relationship holds when its algebraic value is higher than zero. As soon as this expression has a value of zero or less than zero, the control voltage will be zero. $|I|$ represents a direct-current voltage proportional to the amplitude of the current flowing through the load impedance; $|V|$ represents a direct-current voltage proportional to the amplitude of the voltage across the load impedance; $|S|$ represents a direct-current voltage which is equal to the vectorial sum of two voltages $V_1$ and $I_1$ which in turn are proportional respectively to the quantities $|V|$ and $|I|$, supra; and C representing a constant direct-current voltage.

The invention will be explained more fully in connection with the accompanying drawing wherein like components in the figures are identified by like reference numerals.

Fig. 1 is a schematic circuit diagram of one preferred embodiment of an amplifier stage incorporating a protection circuit in accordance with the invention, Fig. 2 is a schematic circuit diagram of a second preferred embodiment of the invention, and Figs. 3*a*, *b* and *c* are vector diagrams explanatory of the invention.

In Fig. 1, the anode circuit of the amplifying tube 1 which is to be protected includes an output transformer 2, whose secondary winding 3 is connected to a load impedance 4 in series with the primary winding of a current transformer 5. This load impedance will at first be considered to be a pure resistive load.

The voltage across another secondary winding 6 of transformer 2 is rectified by means of a rectifier 7 and a smoothing filter 8. The voltage set up at the secondary winding 9 of transformer 5 is likewise rectified by rectifier 10 and smoothing filter 11.

The windings 6 and 9 are so proportioned that, when resistance 4 has attained the value R at which tube 1 dissipates the maximum permissible energy at the maximum permissible anode current, the direct voltages set up across filters 8 and 11 respectively are equal. This limit value for impedance 4 will hereinafter be referred to as the nominal load resistance R.

Owing to the presence of rectifier 12, a voltage between points 13 and 14 is produced only if the amplitude of the alternating voltage across winding 6 is smaller than the alternating voltage across winding 9. This will occur when resistance 4 has a lower value than the predetermined nominal load resistance R.

The voltage generated between points 13 and 14 serves as control voltage, reducing the mutual conductance, of the amplifying tube to be protected or of one or more amplifying tubes preceding this tube.

The circuit with the parameters described will not be satisfactory if the load impedance 4 has a reactive component. This may be seen by referring to the vector diagram Fig. 3*a*, in which $V_n$ and I represent the voltage vectors across windings 6 and 9 respectively. If impedance 4 equals the nominal load resistance, the said vectors are identical but of opposite direction.

If, however, the load has a reactive component, winding 6 will develop a voltage V′ which is shifted in phase with respect to $V_n$. The value of impedance 4 at which its resistance component equals R will be the nominal load impedance. The length of vector V′ is proportional to impedance 4, as the current through this impedance is proportional to the length of vector I, and assumed to be constant. In order that equilibrium be re-established, vector V′ must be located so as to terminate at the dotted line in quadrature to vector $V_n$. At this condition, V′ is equal to $V'_n$.

Since the length of $V'_n$ is greater than that of $V_n$ the voltage developed across winding 6 with a reactive component in impedance 4 must remain appreciably higher than that appearing across winding 9.

Figure 2 shows a circuit in which a control voltage is generated between 13 and 14 in the event that the voltage V′ developed across winding 6 is smaller than the required length of $V'_n$.

In this figure, in which the same reference numerals are used as in Fig. 1, the transformers 2 and 5 each have an additional secondary 15, 16 respectively. The vectorial sum of the voltages across windings 15, 16 is rectified by rectifier 7 and smoothing filter 18. The control voltage is constituted by the algebraic sum of the voltages developed across filters 11, 18, and 8. Filter 8 will have a voltage opposed to the sum of the voltages across filters 11 and 18. Due to the presence of rectifier 12, the control voltage between 13 and 14 will be zero if the sum of voltages appearing across filters 11 and 18 is smaller than the voltage appearing across filter 8.

It is assumed, in Fig. 2, that the voltages V and I are developed across the windings 6 and 9 respectively. These voltages are equal when impedance 4 assumes the value R and is composed of pure resistance. Voltages $V_1$ and $I_1$ are developed across windings 15 and 16 respectively. 15 and 16 are so connected and proportioned that voltages $V_1$ and $I_1$ are exactly equal and opposite in phase. If impedance 4 has a reactive component and a resistive component=R, the vector diagram shown in Figure 3*b* is obtained.

In Fig. 3*b* S is the vectorial sum of $V_1$ and $I_1$. The circuit is so designed that $|V|=|I|+|S|$. Assuming that $$V_1=\frac{V}{a}$$

where $a$ is a constant, then $$I_1=\frac{I}{a}$$

The resultant of vectors V and $-$I will then give the quadrature component $a$S, from similar triangles formed with respect to the vector addition of $V_1+(-I_1)$. The calculation shows that the tip of vector V follows a fourth-degree curve indicated by the dot-and-dashline. If the values chosen for the constant $a$ are between 2 and 4, the dotted line $a$S will be an approximation of the fourth degree curve.

A smaller number of circuit elements are required and more satisfactory results are obtained if the proportioning of the circuits is such that for a value of impedance 4 equal to R the voltage developed across winding 16 is exactly twice the value of that appearing at winding 6 and winding 15. Should these parameters be maintained, winding 9 and circuit elements 10 and 11 may be dispensed with.

The vector diagram corresponding with these parameters is shown in Figure 3*c*. It can be readily appreciated that the length of vector S for different values of phase angle between V and I always remains equal to that of vector V. Consequently, the tip of vector V is located on the line of symmetry of vector $-I_1$ so that the limit value at which the control begins exactly equals the nominal load impedance for any value of the phase angle between the voltages V and I.

A disadvantage of the circuits as shown is that the control begins if the anode current of tube 1 does not attain its maximum permissible value. It is possible to provide that the control will not operate before $|I|$ is greater than $|V|-|S|+|C|$ by providing a predetermined threshold voltage $C_1$, in the lead 13, or a threshold voltage $C_2$ in series with rectifier 12.

Such a provision would not be required if for example in Figure 2, rectifier 12 were omitted. The control voltage then produced would bring about a considerable decrease of the dynamic strength of the signal supplied to the amplifier.

The circuits as shown may be simplified in many respects. Thus, rectifiers 7, 10 and 7, 17 respectively may be united to form one unit. Rectifier 12 may advantageously be replaced by a diode housed in one of the tubes preceding the tube that is to be protected.

What we claim is:

1. An overload protection circuit for amplifying tubes in class AB, B, and C coupled to a load impedance, comprising a first unidirectional element coupled to said load impedance to derive a first polarized voltage proportional to the alternating current flowing through the load impedance, a second unidirectional element coupled to said amplifying tubes to derive a second polarized voltage proportional to the alternating voltage across the load impedance, means to combine algebraically said first and second polarized voltages, means to derive an overload control voltage from the said combined first and second voltages in the condition where the algebraic sum of the said first and second voltages exceeds zero solely in a predetermined polarity, and means to apply the said overload control voltage to the amplifying tubes.

2. An overload protection circuit for amplifying tubes in class AB, B, and C coupled to a load impedance, comprising a first unidirectional element coupled to said load impedance to derive a first polarized voltage proportional to the alternating current flowing through the load impedance, a second unidirectional element coupled to said amplifying tubes to derive a second polarized voltage proportional to the alternating voltage across the load impedance, a third unidirectional element coupled to said load impedance and to said amplifying tubes to derive a third polarized voltage proportional to the vector sum of the said alternating current flowing through the load impedance and the alternating voltage across the said impedance, means to combine algebraically said first, second and third polarized voltages, means to derive an overload control voltage from the said combined first, second and third voltages in the condition where the algebraic sum of the said first, second and third voltages exceeds zero solely in a predetermined polarity, and means to apply the said overload control voltage to the amplifying tubes.

3. An overload protection circuit for amplifying tubes in class AB, B, and C coupled to a load impedance, comprising a first unidirectional element coupled to said load impedance to derive a first polarized voltage proportional to the alternating current flowing through the load impedance, a second unidirectional element coupled to said amplifying tubes to derive a second polarized voltage proportional to the alternating voltage across the load impedance, a third unidirectional element coupled to said load impedance and to said amplifying tubes to derive a third polarized voltage proportional to the vector sum of the said alternating current flowing through the load impedance and the alternating voltage across the said impedance, a source of direct current potential, means to combine algebraically said first, second, and third polarized voltages and the said source of direct current potential, means to derive an overload control voltage from the said combined first, second and third voltages and the source of direct current potential in the condition where the algebraic sum of the said first, second and third and the source of direct current potential voltages exceeds zero solely in a predetermined polarity, and means to apply the said overload control voltage to the amplifying tubes.

4. An overload protection circuit for amplifying tubes in class AB, B, and C coupled to a load resistance, comprising a first unidirectional element coupled to said load resistance to derive a first polarized voltage proportional to the alternating current flowing through the load resistance, a second unidirectional element coupled to said amplifying tubes to derive a second polarized voltage proportional to the alternating voltage across the load resistance, a third unidirectional element coupled to said load resistance and to said amplifying tubes to derive a third polarized voltage proportional to the vector sum of the said alternating current flowing through the load resistance and the alternating voltage across the said resistance, a source of direct current potential, means to combine algebraically said first, second and third polarized voltages and the said source of direct current potential, means to derive an overload control voltage from the said combined first, second and third voltages and the source of direct current potential in the condition where the algebraic sum of the said first, second and third voltages and the source of direct current potential exceeds zero solely in a predetermined polarity, and means to apply the said overload control voltage to the amplifying tubes.

5. An overload protection circuit for amplifying tubes in class AB, B, and C coupled to a load impedance, comprising a first unidirectional element coupled to said load impedance to derive a first polarized voltage proportional to the alternating current flowing through the load impedance, a second unidirectional element coupled to said amplifying tubes to derive a second polarized voltage proportional to the alternating voltage across the load impedance, a third unidirectional element coupled to said load impedance and to said amplifying tubes to derive a third polarized voltage proportional to the vector sum of a fourth voltage proportional to and less than the said first polarized voltage and a fifth voltage proportional to and less than the second polarized voltage, a source of direct current potential, means to combine algebraically said first, second and third polarized voltages and the said source of direct current potential, means to derive an overload control voltage from the said combined first, second and third voltages and the source of direct current potential in the condition where the algebraic sum of the said first, second and third voltages and the source of direct current potential exceeds zero solely in a predetermined polarity, and means to apply the said overload control voltage to the amplifying tubes.

6. In a class B push-pull amplifier, having a first transformer coupling the amplifying tubes to the output load impedance, an overload protection circuit comprising, a second transformer having primary and secondary windings, means to introduce a portion of the current flowing through the output load impedance to the primary winding of the second transformer, a first unidirectional element coupled to the secondary winding of said second transformer to derive from the secondary winding of said second transformer a first unidirectional potential proportional to the alternating current flowing through said load impedance, a secondary winding coupled to said first transformer, a second unidirectional element coupled to the secondary winding of said first transformer to derive from the secondary winding of said first transformer a second unidirectional potential proportional to the alternating voltage across the load impedance, means to combine algebraically the said first and second unidirectional potentials, means to derive an overload control voltage from the said combined first and second unidirectional potential in the condition when the algebraic sum of the said first and second unidirectional potentials exceeds zero solely in a predetermined polarity, said latter means comprising a third unidirectional element, and means to apply the said overload control voltage to the amplifying tubes.

7. In a class B push-pull amplifier, having a first transformer coupling the amplifying tubes to the output load impedance, an overload protection circuit comprising, a second transformer having a primary and first and second secondary windings, means to introduce a portion of the current flowing through the output load impedance to the primary of the second transformer, a first unidirectional conductor coupled to the first secondary winding of said second transformer to derive a first unidirectional potential proportional to the alternating current flowing through the output load impedance, first and second secondary windings coupled to the first transformer, a second unidirectional conductor coupled to the first secondary winding of the first transformer to derive a second unidirectional potential proportional to the alternating voltage across said output impedance, a series coupling of the second secondary windings of the said first and second transformer, a third unidirectional conductor to derive a third unidirectional potential from the said series coupling of the second secondaries of the said first and second transformers, means to combine algebraically the said first, second and third unidirectional potentials, means to derive an overload control voltage from the said combined first, second and third unidirectional potentials in the condition when the algebraic sum of the said first, second and third unidirectional potentials exceeds zero solely in a predetermined manner, said latter means comprising a fourth unidirectional conductor, and means to apply the said overload control voltage to amplifying tubes.

8. In a class AB, B, and C amplifier having a first transformer coupling the amplifying tube to the output load resistance, an overload protection circuit comprising, a second transformer having primary and secondary windings, means to introduce a portion of the current flowing through the output load resistance to the primary winding of the second transformer, a first unidirectional conductor coupled to the secondary winding of said second transformer to derive from the secondary winding of said second transformer a first unidirectional potential proportional to the alternating current flowing through the load impedance, a secondary winding coupled to the first transformer, a second unidirectional conductor coupled to the secondary winding of the first transformer to derive from the secondary winding of said first transformer a second unidirectional potential proportional to the alternating voltage across the load impedance, means to combine algebraically said first and second unidirectional potentials, means to derive an overload control voltage from the said combined first and second unidirectional potential in the condition when the algebraic sum of the said first and second unidirectional potentials exceeds zero solely in a predetermined polarity, said latter means comprising a third unidirectional conductor, and means to apply the said overload control voltage to the amplifying tube.

9. In a class AB, B, and C amplifier having a first transformer coupling the amplifying tube to the output load resistance, an overload protection circuit comprising, a second transformer having a primary and first and second secondary windings, means to introduce a portion of the current flowing through the output load resistance to the primary of the second transformer, a first unidirectional conductor coupled to the first secondary winding of said second transformer to derive a first unidirectional potential proportional to the alternating current flowing through said output load resistance from the first secondary winding of said second transformer, first and second secondary windings coupled to the first transformer, a second unidirectional conductor coupled to the first secondary of said first transformer to derive a second unidirectional potential proportional to the alternating voltage across said output load resistance from the first secondary of said first transformer, a series coupling of the second secondary windings of the said first and second transformer, a third unidirectional conductor coupled to the second secondaries of said first and second transformers to derive a third unidirectional potential from said series coupling of the second secondaries of said first and second transformers, means to combine algebraically said first, second and third unidirectional potentials, means to derive an overload control voltage from the said combined first, second and third unidirectional potentials in the condition where the algebraic sum of said first, second and third unidirectional potentials exceeds zero solely in a predetermined manner, said latter means comprising a fourth unidirectional conductor, and means to apply said overload control voltage to the amplifying tube.

PIETER KLAAS BUYS.
JOHANNES MEYER CLUWEN.

REFERENCES CITED

The following references are of record in the file of this patent:

UNITED STATES PATENTS

| Number | Name | Date |
|---|---|---|
| 2,038,110 | Hopkins | Apr. 21, 1936 |
| 2,152,328 | Schade | Mar. 28, 1939 |
| 2,153,172 | Buschbeck | Apr. 4, 1939 |
| 2,156,846 | Getaz | May 2, 1939 |